April 19, 1960 T. F. JONES, JR 2,933,672
MAGNETIC AMPLIFIER
Filed March 28, 1955
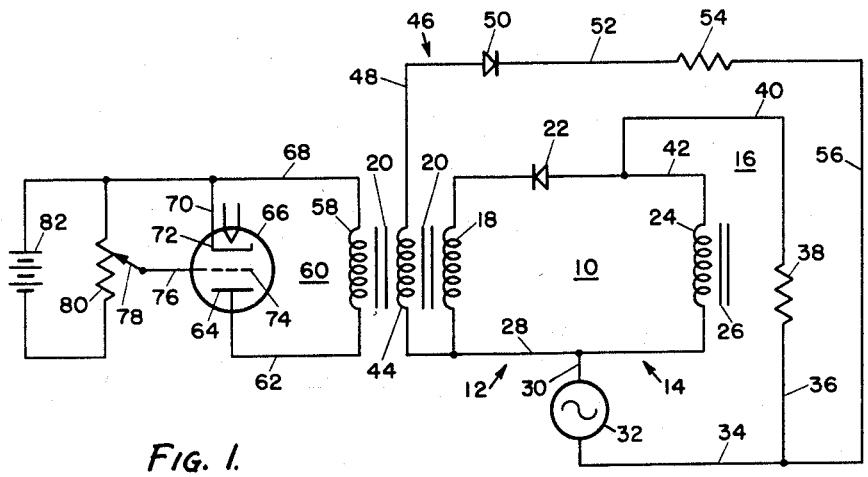
FIG. 1.
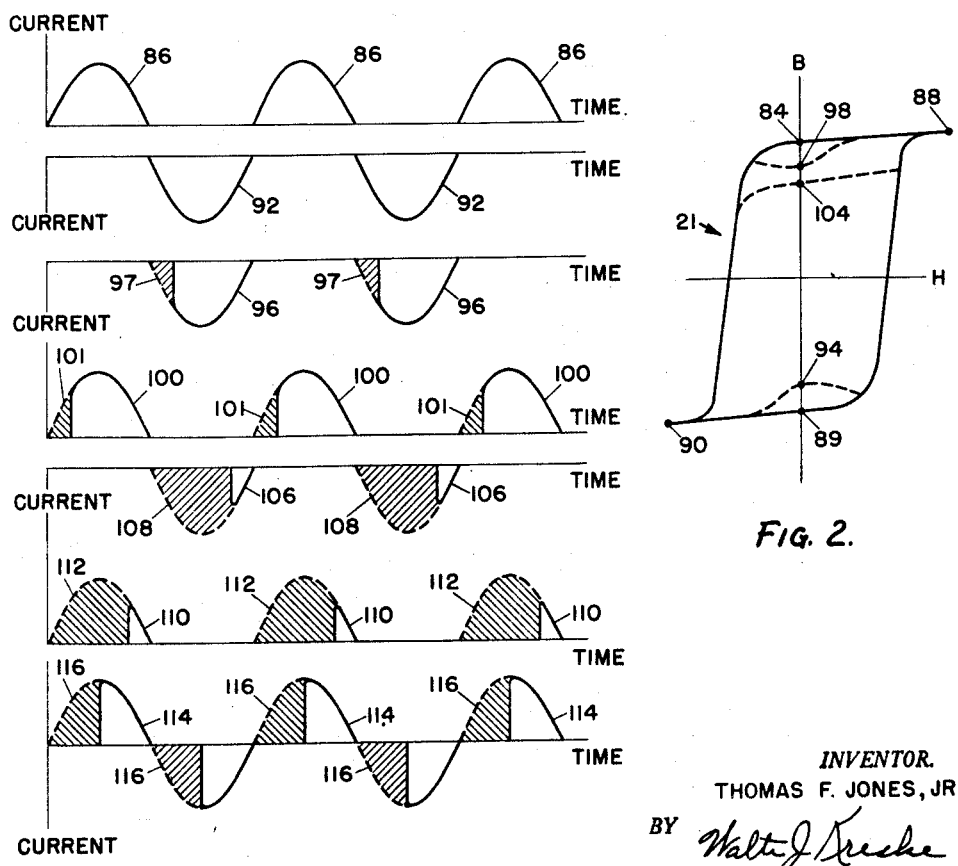
FIG. 3.
FIG. 2.
INVENTOR.
THOMAS F. JONES, JR.
BY
ATTORNEY United States Patent Office 2,933,672
Patented Apr. 19, 1960

2,933,672

MAGNETIC AMPLIFIER

Thomas F. Jones, Jr., Squantum, Mass., assignor to General Electronic Laboratories, Inc., Cambridge, Mass., a corporation of Massachusetts Application March 28, 1955, Serial No. 497,090

6 Claims. (Cl. 323—89)

This invention relates to improvements in magnetic core inductive type circuits for controlling the magnitude of alternating current power to a load.

Magnetic core inductive type circuits in combination with uni-directional current devices may be used with alternating current power sources for controlling the magnitude of power fed to a load. Such circuits, herein termed magnetic amplifiers, when used to control both the positive and negative half cycles of output of the power source have heretofore entailed a doubler consisting of two parallel connected, current carrying legs, each of which had an inductively wound magnetic core and a unidirectional current valve such as a rectifier. The rectifier in one of the legs was oriented to pass current during the positive half cycle of output and the rectifier in the other leg was oriented to pass current during the negative half cycle. A separate control arrangement for each leg was provided for resetting the magnetic state of the respective core for each half cycle in the respective winding.

Pursuant to the present invention, a magnetic amplifier arrangement has been devised wherein only one half of the number of rectifiers and reset control circuits, heretofore necessary, are used to control both negative and positive half cycles of the alternating current power source output. In accordance with the present invention, only a single rectifier is required in the magnetic amplifier doubler where heretofore two have been used. Also, only a single reset circuit arrangement operating on only one of the legs need be used in accordance with applicant's invention where heretofore two reset circuits, one for each leg have been used. Thus, a prime object of the invention is to reduce the number of control circuits and components required in magnetic amplifiers.

Another object is to achieve this reduction in numbers of required components and circuits in magnetic amplifiers without impairing the function of the magnetic amplifier as a device for controlling the magnitude of power of an alternating current power source fed to a load.

A further object is to reduce the number of components and circuits in a magnetic amplifier required to maintain control over the magnitude of load current throughout the entire cycle of the alternating current power source.

Still further objects are to reduce the space requirements, bulkiness and cost over magnetic amplifiers heretofore used.

These features, objects and advantages are achieved generally by providing a magnetic amplifier doubler in a power circuit having a power source and load, and providing in the doubler only a single unidirectional current valve, as a rectifier, in one of the legs of the doubler, and a magnetic core reset circuit arrangement inductively coupled to the magnetic core of the leg of the doubler containing the unidirectional current valve. By this construction the reset circuit arrangement controls the magnetic state of the magnetic core in the leg containing the rectifier. This leg in turn controls the magnetic state of the magnetic core in the other leg of the doubler. Thereby, the complete cyclic output of the power source to the load is achieved.

These and other features, objects and advantages of the invention will become more apparent from the following description taken in connection with the accompanying drawings and wherein:

Fig. 1 is a schematic drawing of a preferred embodiment of a magnetic amplifier constructed in accordance with the present invention;

Fig. 2 is a view of an exemplary hysteresis loop of a magnetic core of the magnetic amplifier shown in Fig. 1;

Fig. 3 is a graphical representation of load current to more clearly illustrate the operation of the magnetic amplifier shown in Fig. 1.

Referring to Fig. 1 in more detail, a magnetic amplifier doubler is designated generally by the numeral 10 and is comprised of two current carrying legs 12 and 14 connected in parallel in an alternating current power circuit 16. The current carrying leg 12 has an inductive winding 18 on a magnetic core 20 preferably of the type having a square hysteresis loop characteristic 21 shown as a graph in Fig. 2 where H is the field intensity and B the magnetic flux density. However, it should be understood that magnetic cores with other than square hysteresis loop characteristics may also be used. In series with the inductive winding 18 in leg 12 is a unidirectional current valve 22 such as a rectifier.

The other leg 14 of the doubler 10 has therein an inductive winding 24 on a magnetic core 26. The inductive winding 24 is preferably similar to the inductive winding 18 and the magnetic core 26 is preferably similar to the magnetic core 20 with a similar hysteresis loop characteristic. The doubler 10 is connected at one end by a line 28 to one end of a line 30, the other end of which is connected to one terminal of an alternating current power source 32, in the power circuit 16. The other terminal of the alternating current power source 32 is connected through lines 34 and 36 to one side of a load 38. The other side of load 38 is connected through a line 40 to a line 42 to which is connected the other end of the doubler 10.

The alternating current power source 32 is also connected through lines 30 and 28 to one end of a second inductive winding 44 on the magnetic core 20, in a reset circuit 46. The other end of the winding 44 in the reset circuit 46 is connected through a line 48, unidirectional current valve 50 such as a rectifier, line 52, a bias resistor 54, a line 56 and the line 34 to the other terminal of the alternating current power source 32.

A third inductive winding 58 in a reset control circuit 60 is inductively wound on the magnetic core 20. One end of the winding 58 is connected through a line 62 to the plate 64 of a grid controlled electron tube 66 such as a triode. The other end of the winding 58 is connected through a line 68 and a line 70 to cathode 72 of the electron tube 66. Control grid 74 of the electron tube 66 is connected through a line 76 to a resistance adjusting arm 78 on a potentiometer resistance 80 connected across the terminals of a biasing voltage source such as a battery 82. The positive terminal of the battery 82 is connected through the lines 68 and 70 to the cathode 72 of the electron tube 66.

In operation, assuming a sinusoidal output by the power source 32, if at the start of each positive half cycle the winding 24, the magnetic state of the core 26 is in substantially a saturated condition such as indicated by a point 84 on the flat portion of the hysteresis loop 21 (Fig. 2) each positive current half cycle will appear substantially undiminished at the load 38 as the current wave 86 in Fig. 3. As each positive current half cycle 86 rises it will drive the core 26 further into saturation to a point 88 corresponding to the rising peak of the current wave. During the receding portion of the half cycle 86, the magnetic state of the core will follow the hysteresis path back to point 84 which corresponds to a zero current value in the winding 24.

Similarly, if the core 20 is in a magnetic state such as indicated by a point 89 on the flat portion of the hysteresis loop 21, each negative load current half cycle appearing in the coil 18 will drive core 20 further into saturation such as to a point 90 and the load current wave will appear at load 38 substantially undiminished as represented by a curve 92 (Fig. 3). Point 90 on the hysteresis loop 21 corresponds to the peak value of each negative current half cycle 92 and point 89 corresponds to the zero current value of each negative current half cycle 92.

Disregarding for a moment the effects of the reset circuit 46 and control circuit 60, because of rectifier 22, each positive current half cycle 86 is in fact channeled through the winding 24 to the load 38 and prevented from flowing through winding 18, except for a small amount of leakage across the rectifier 22. Thus, during each positive current half cycle, the core 26 would in fact become saturated in the positive direction. However, during the negative current half cycle, the rectifier 22 does not restrict current flow in either winding. Thus, during the negative half cycle current may flow through the winding 18 as well as the winding 24. If during each negative output half cycle the magnetic state of core 20 is at point 89 (Fig. 3) which is at substantial saturation, there would be practically no impedance in winding 18 to the negative current half cycle and therefore the winding 18 would appear as a shunt across the winding 24. On the other hand, because of the magnetic state of core 26 being at substantial saturation in the opposed direction from the previous positive current half cycle, the winding 24 would present a high impedance to the negative current half cycle. Therefore, there would be practically no current flowing through the winding 24 during this negative current half cycle. Substantially all of the current in this negative half cycle would flow through the winding 18.

Actually, however, some leakage does occur across the rectifier 22. Therefore, the magnetic state of core 20, because of this leakage, would during the previous positive current half cycle fall back to some point 94 on the hysteresis loop 21. Thus, some diminution of each following negative half cycle will occur. Instead of current wave 92 (Fig. 3), the negative current half cycles through the winding 18 will appear approximately as shown by the curve 96 with the cross hatched areas 97 representing the amount by which the load current in each negative current half cycle has been diminished due to this changed magnetic state of the core 20. During these negative current half cycles, therefore, the impedance caused by the changing magnetic state of core 20 from point 94 (Fig. 2) will result in current flow through the winding 24 which will reduce the magnetic state of core 26 to a point 98 on the hysteresis loop 21. The point 98 represents substantially the same amount of reduction as that represented by the point 94 for the core 20. Thus, during each following positive current half cycle channeled by rectifier 22 through winding 24, the load current will be slightly diminished and will appear as curve 100. The cross hatched portions 101 represent the amount of diminution of load current and are substantially identical in area to the cross hatched portion 97 in the opposite half cycles of the load current.

Now taking into consideration the reset circuit 46 and disregarding the control circuit 60, during each positive half cycle of the load current, the magnetic state of core 20 will be reset by current flow in winding 44 to some point 104 on the hysteresis loop 21. The magnitude of reset will be determined by the resistance value of the bias resistor 54 which is selected to provide for a desired maximum reset condition in core 20 during each positive current half cycle from the power source 32. No current will flow in the reset circuit 46 during the negative current half cycle because of the rectifier 50. Thus, each succeeding negative half cycle 106 (Fig. 3) will be at minimum load current. The cross hatched portions 108 show the amount by which the load current is diminished from the maximum value shown by the curve 92. In similar manner to that explained above with regard to curves 96 and 100, during each negative half cycle the magnetic state of core 26 will be reset by a similar amount to that of core 20 and the positive current half cycles will correspondingly be at a minimum value as shown by curves 110 with the cross hatched portions 112 having substantially the same area as the cross hatched portions 108 of the opposite current half cycles 106.

Now with the control winding 58 in the control circuit 60, the reset value of the core 20 may be selectably controlled between substantially the points 104 and 94 on the hysteresis loop 21. This control is achieved by suitable setting of adjusting arm 76 on the potentiometer resistance 80. By such selectable setting, the control grid 74 is biased to make the tube 66 conductive upon the appearance of selected induced voltages across the winding 58. The resulting induced current flow in the control winding 58 will be in a direction opposing the change in magnetic state of core 20.

The full cyclic output load current will thereby appear at any selected value within the selectable range discussed above as a curve 114 with the cross hatched portions 116 designating the amount by which the load current has been diminished as determined by the setting of adjusting arm 78 on the variable resistance 80.

What is claimed is:

1. A magnetic amplifier for operation in an alternating current circuit comprising two magnetic cores, an inductive winding on each of said cores and connected to form a pair of legs in parallel and a series closed loop across said alternating current circuit, a single rectifier in said series closed loop, and electric circuit control means coupled to only one of said cores for controlling the impedance of said parallel legs.

2. A magnetic amplifier for operation in an alternating current circuit comprising a first and a second magnetic cores, each of said cores having a square hysteresis loop characteristic, an inductive winding on each of said cores and connected to form a pair of legs in parallel and a series closed loop across said alternating current circuit, a single rectifier in said parallel legs, said rectifier being connected in said series closed loop in series with said power source and winding on the first core, and electric circuit control means coupled to only the first core for controlling the impedance of said parallel legs.

3. A magnetic amplifier for operation in an alternating current circuit comprising a first and a second magnetic cores, an inductive winding on each of the cores, the inductive windings being connected in parallel, a single rectifier connected in series with the winding on the first core for confining magnetization of the first core to substantially one direction, reset circuit means inductively coupled to the first magnetic core, a unidirectional current device in the reset circuit means for confining current flow through the reset inductive coupling to a direction opposing the magnetization of the first core, and means inductively coupled to the reset circuit means for selectively limiting the extent of the opposed magnetization.

4. A magnetic amplifier for controlling both negative and positive load current half cycles in an alternating current circuit comprising a first and a second magnetic cores, an inductive winding on each of said cores, the inductive windings being connected in parallel, a single rectifier connected in series with the winding on the first core for restricting current flow through the first winding to substantially one unidirectional half cycle of the alternating current, a single reset circuit for said cores, said reset circuit being inductively coupled to the first of the cores, means in the reset circuit for restricting current flow through the reset inductive coupling to substantially the other half cycle of said alternating current, and control means coupled to the reset circuit for controlling the magnitude of reset of said first core by said reset circuit.

5. A magnetic amplifier for controlling both negative and positive load current half cycles in an alternating current circuit comprising a pair of magnetic cores, an inductive winding on each of said cores, the inductive winding being connected in parallel, a single unidirectional current device connected in series with one of said windings for restricting current flow through the winding to substantially one unidirectional half cycle of the alternating current, a single reset circuit for the cores, said reset circuit being inductively coupled to only one of the cores, a unidirectional current device in the reset circuit for restricting current flow through the reset inductive coupling to substantially one reset half cycle of said alternating current, and control means inductively coupled to the reset circuit for controlling the magnitude of reset of the core by the reset circuit.

6. In combination, an alternating current power source having a negative and positive half cycle, a load, a circuit connecting said power source to said load, a first and a second magnetic cores, an inductive winding on each of said cores, a rectifier in series with the winding on said first core for restricting current flow through said first winding to substantially one of said unidirectional half cycles of said alternating current, said series rectifier and first core winding arrangement connected in parallel with the second core winding in said circuit, a second inductive winding on said first core, a circuit connecting said second winding across said alternating current power source, a rectifier in series with said second inductive winding restricting current flow through said second winding to the other of said current half cycles, a resistor in series with said second winding for limiting current flow in said second winding to a maximum reset condition in said first core, a third inductive winding on said first core, a triode connected across said third inductive winding, said triode being oriented to restrict current flow through said third winding to a direction opposing the resetting of said first core by said second winding, and voltage means for biasing said triode.

References Cited in the file of this patent

UNITED STATES PATENTS

| | | |
|---|---|---|
| 2,126,790 | Logan | Aug. 16, 1938 |
| 2,503,039 | Glass | Apr. 4, 1950 |
| 2,731,521 | Crawford | Jan. 17, 1956 |
| 2,734,165 | Lufcy et al. | Feb. 7, 1956 |
| 2,754,473 | Hooper | July 10, 1956 |
| 2,770,770 | Lufcy | Nov. 13, 1956 |
| 2,786,177 | Werner | Mar. 19, 1957 |
| 2,800,626 | Bastian | July 23, 1957 |

OTHER REFERENCES

Publication: "An Improved Magnetic Servo Amplifier," by C. W. Lufcy, A. E. Schmid and P. W. Barnhart, AIEE Transactions, vol. 71, part I, September 1952, pp. 281–289, inclusive.